United States Patent [19]

Pithie

[11] 4,114,961
[45] Sep. 19, 1978

[54] BEARINGS

[75] Inventor: Donald Roy Pithie, Shrewsbury, England

[73] Assignee: Rolls-Royce Motors Limited, London, England

[21] Appl. No.: 744,417

[22] Filed: Nov. 23, 1976

[51] Int. Cl.² .................. F16C 33/04; B21D 53/10
[52] U.S. Cl. .................... 308/237 R; 308/23;
29/149.5 R; 74/579 E
[58] Field of Search ............. 308/23, 167, 179, 237 R;
29/149.5 R, 149.5 C, 445; 403/344, 408(U.S. only); 74/579 E

[56] References Cited

U.S. PATENT DOCUMENTS

| 1,803,317 | 5/1931 | Brown | 74/579 E |
|---|---|---|---|
| 2,311,434 | 2/1943 | Dusevoir | 403/408 X |
| 2,371,614 | 3/1945 | Graves | 308/23 |
| 2,553,935 | 5/1951 | Parks et al. | 308/23 X |
| 3,069,926 | 12/1962 | Hoffman et al. | 308/23 X |

FOREIGN PATENT DOCUMENTS

| 718,435 | 1/1932 | France | 74/579 E |
|---|---|---|---|
| 731,271 | 2/1943 | Fed. Rep. of Germany | 29/149.5 R |

Primary Examiner—Robert B. Reeves
Assistant Examiner—Edward M. Wacyra
Attorney, Agent, or Firm—Cushman, Darby & Cushman

[57] ABSTRACT

The big end bearing cap of an internal combustion engine connecting rod is connected to the remainder of the connecting rod by bolts which locate the big end bearing shells both angularly and axially of the bearing. The machining of the bearing surface is carried out with the cap bolted to the remainder by either the bolts which are to form part of the completed connecting rod or by slave bolts which may be repeatedly used. In the former case, parts of the bolts are cut away as the envelope of the bearing cylinder and those of the bolt holes overlap and in the final assembly of the bearing these bolts are turned through 180° so that their cut-away portions face away from the bearing surface.

10 Claims, 6 Drawing Figures

BEARINGS

The present invention relates to bearings and particularly, but not exclusively, to connecting rod big end bearings for internal combustion engines.

BACKGROUND OF THE INVENTION

The big end of a connecting rod must be designed so as to incorporate an adequate bearing diameter, at the same time preferably being of such dimensions, when the bearing cap is removed, as to allow the connecting rod to pass through the cylinder bore.

The design of reciprocating piston internal combustion engines has incorporated various means of achieving the largest possible big end bearing diameter consistent with a connecting rod that would pass through the cylinder bore. The advantages of doing so are that firstly for an adequate bearing area, the larger the bearing diameter the shorter can be its length and this in turn is likely to allow the distance between cylinders and therefore the overall length of the engine to be shorter, this having particular significance in the case of "V" form engines where two connecting rod big ends share a common crankpin. Secondly, in an axial view of the crankshaft, the greater the overlap between the diameters of the crankpins that carry the big end bearings and the diameters of the main crankshaft bearings, the greater the crankshaft strength. In the case of diesel engines where bearing loads are apt to be particularly heavy, there have been many examples of the facings between the connecting rod and its bearing cap being cut at an oblique angle to the longitudinal axis of the connecting rod. Whilst this produced a narrow connecting rod relative to the bearing diameter, it brought with it asymmetric stress distribution with a resultant distortion problems when under load, and the elaborate methods needed to locate the cap and prevent unduly high bending loads in the bolts resulted in added manufacturing cost and the risk of undesirable areas of stress concentration.

There is therefore considerable incentive to design big ends with a 90° split (that is where the plane in which the facings between the connecting rod and the end cap lie is at 90° to the longitudinal axis of the connecting rod), and various methods have been tried in attempts to optimise the size of big end bearing consistent with the ability to pass the big end of the connecting rod through the cylinder bore.

Known big end bearing designs having a 90° split usually incorporate a two piece annular thin wall bearing shell of generally uniform thickness each semicircular half of this bearing shell having a pressed out "tang" for its axial location, the tang also providing a safeguard against rotation of the bearing shell within the big end. In such known designs the distance between the centre lines of the big end bolts on either side of the bearing is kept as small as possible without physically interfering with the bearing shell.

A further known development is to use four relatively small diameter big end bolts instead of two relatively large diameter bolts, thus enabling a larger bearing diameter to be arranged within the same overall outside dimension at the same time providing a more even clamping load on the bearing shells. When these bolt centres are reduced to the extent that the bolt either comes close to or interferes with the bearing shell, it becomes impracticable to find room for the usual tangs for bearing shell location purposes.

BRIEF SUMMARY OF THE INVENTION

According to one aspect of the present invention there is provided a shaft bearing comprising two complementary parts providing an internal cylindrical surface, two replaceable bearing shells disposed within the parts and supported on the cylindrical surface and two connecting bolts disposed on diametrically opposite sides respectively of the cylinder, connecting the two parts together and extending into recesses formed in the external surface of the shells to locate the shells axially of the parts and prevent rotation of the shells with respect to the parts.

According to another aspect of the invention there is provided a method of producing and assembling a shaft bearing comprising two complementary parts including the steps of bolting the parts together, machining them to produce an internal cylindrical surface such that the envelope of the cylinder overlaps the envelopes of the bolt holes, removing the bolts from the bolt holes, forming recesses in a pair of part cylindrical bearing shells of a depth substantially equal to the overlap between the envelopes and placing the shells in the parts and inserting bolts in the bolt holes so that they engage in the recesses in the shells and tightening the bolts to assemble the parts around the shaft to be supported.

The bolts inserted when the bearing is being assembled may be the same as those inserted for the machining operation, but rotated so that the parts of the bolts machined away are remote from the cylindrical surface of the bearing. In this case, in order to ensure that the bolts remain correctly assembled during tightening of the units, the bolts are made "captive" by a knurled or serrated shoulder or other appropriate means.

Alternatively, the bolts inserted when the bearing is being assembled may be different from those inserted for machining.

BRIEF DESCRIPTION OF THE DRAWINGS

In order that the invention may be more clearly understood, one embodiment of the invention will now be described, by way of example, with reference to the accompanying drawings in which.

DETAILED DESCRIPTION OF THE INVENTION

Figure 1:
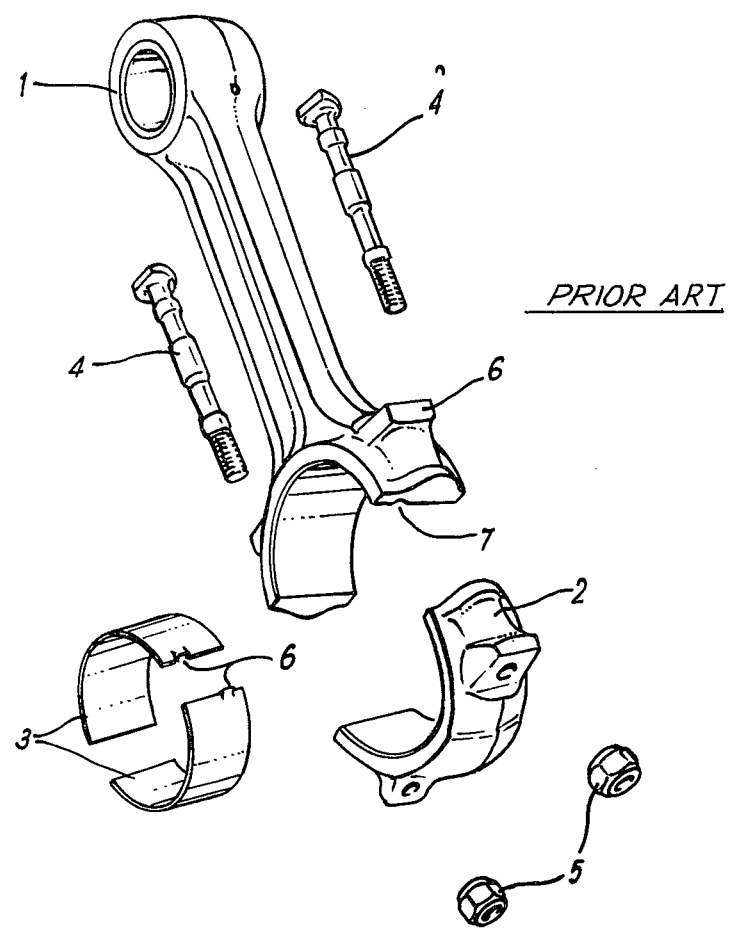
FIG. 1 shows an exploded view of a known connecting rod arrangement.

Referring to FIG. 1 of the drawings, the connecting rod arrangement comprises a connecting rod 1 and end cap 2 which together define an aperture bounded by a cylindrical surface. A pair of big end bearing shells 3 are disposed within this aperture and the assembly is fastened together about the crank shaft (not shown) by assembly bolts 4 and nut 5 which extend through both rod 1 and cap 2. The shells 3 are formed with tang from projections 6 which engage in complementary recesses 7 formed in the rod 1 and cap 2. This engagement locates the shells 3 axially of the aperture defined by the rod 1 and cap 2 and prevents relative rotation between the shells and rod 1 and cap 2.

Figure 2:
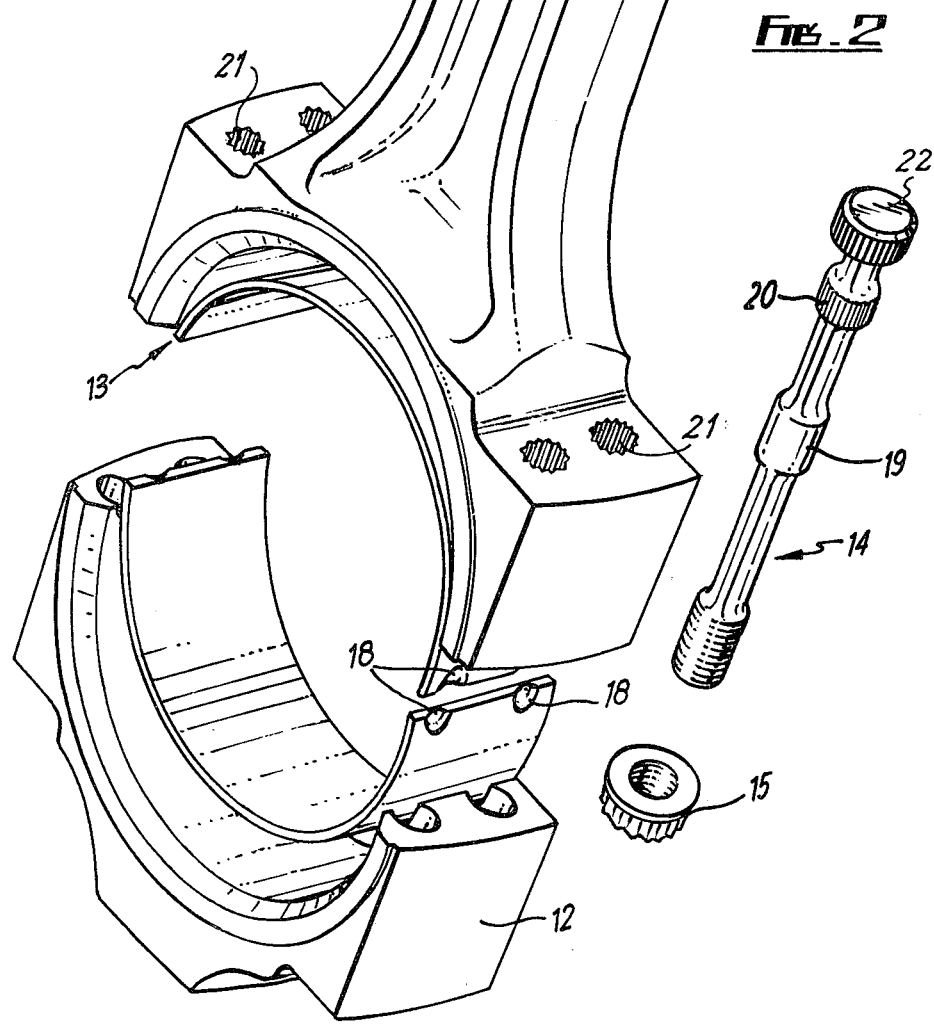
FIG. 2 shows a view similar to FIG. 1 but of a big end bearing according to the invention.

Referring to FIGS. 2 and 3, the connecting rod assembly is similar to that shown in FIG. 1 and comprises a connecting rod 11, end cap 12, big end bearing shells 13, connecting bolts 14 and nuts 15.

Figure 3D:
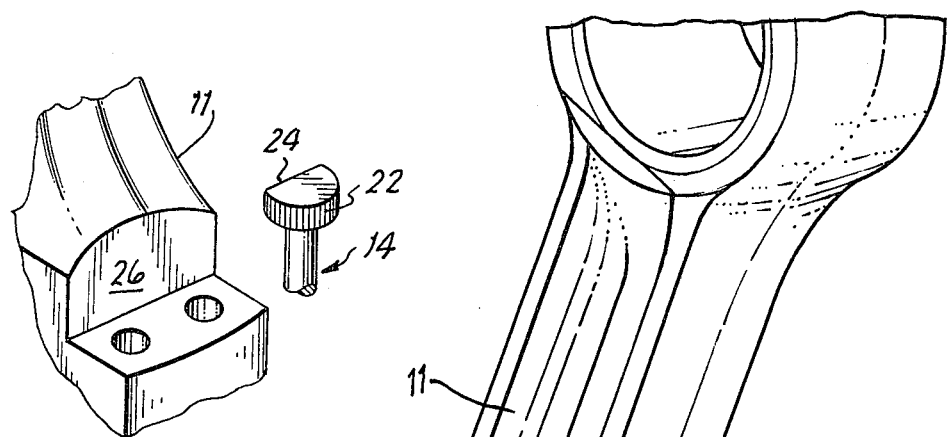
FIG. 3D is a fragmentary perspective view of the rod and illustrating a modified means for preventing the bolt from rotating.
Figure 3C:
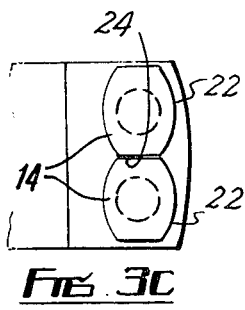
FIG. 3C illustrates a part plan view of the bearing of FIG. 2.

The shells 13, although disposed within the apertures defined by the end cap 12 and rod 11, are not provided with tangs. Instead, recesses 18 are formed in the external surface of these shells and the bolts 14 each have a central portion 19 which engages in these recesses and prevents rotation of the shells 13 with respect to the rod 11 and cap 12 and locates the shells axially relative to the bearing axis of the rod 11 and cap 12. To prevent rotation of the bolts 14 serrated portions 20 are provided which engage in complementary serrated surfaces 21 in the bolt holes. The complementary serrated surfaces 21 in the bolt holes may be formed by pressing the bolts into the holes. Alternatively as shown in FIG. 3D, the bolts heads 22 may be provided with flats 24 which abut corresponding flats 26 formed on the rod 11 or, as shown in FIG. 3C, each bolt head 22 may be provided with the flat 24 which abuts the flat 24 of an adjacent bolt head 22.

Most thin wall bearing shells have their bores very slightly "edge relieved" by internal chamfering either side of the split line. The limit to the depth of recess that can be employed is that there should be no risk of the recess being machined so as to break through into the relieved area.

The recess is in the shape of an arc of a circle having a diameter which subject to production machining tolerances, is substantially the same as the relevant bolt diameter. The machining can be carried out by any suitable production method such as end milling.

Figure 3B:
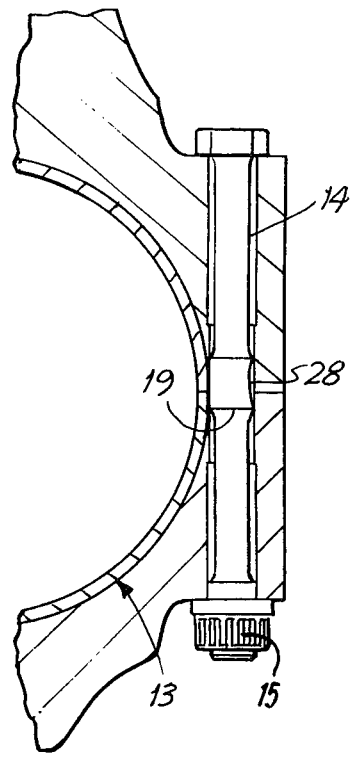
FIGS. 3A and 3B respectively show a cross sectional and a part cross-sectional view of the bearing of FIG. 2.
Figure 3A:
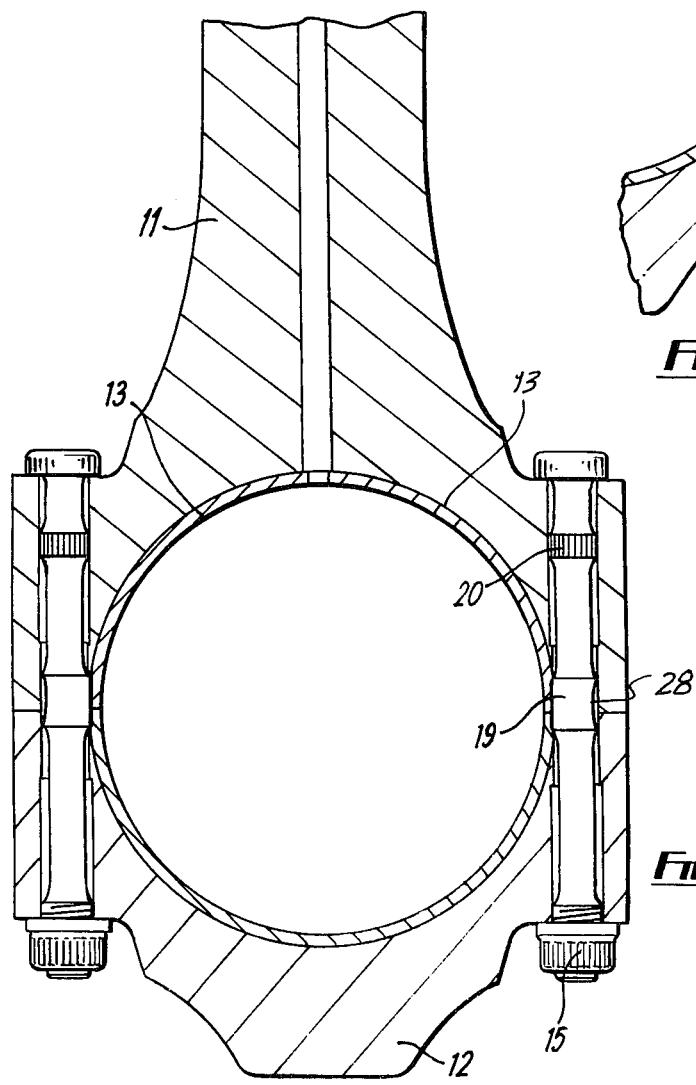

The manner of assembly of the bearing is as follows. The end cap 12 and rod 11 are bolted together and the aperture machined to produce the cylindrical bearing surface. The machining is such that the envelope of the cylinder and the envelope of the bolt holes overlap. This does of course mean that a portion of the bolts 14 used to preliminarily hold the end cap 12 and rod 11 together will be machined away unless they are slave bolts. The bolts are then removed and the big end bearing shells 13 placed inside the rod 11 and end cap 12. The rod 11 and end cap 12 with their associated shells 13 are then placed around the crank shaft and fastened thereon by inserting bolts 14 through the bolt holes and tightening nuts thereon. On insertion of the bolts the serrations 20 and 21 engage each other and the central portions 19 fit into the recesses 18 as shown in FIG. 3B with the machined away portion 28 facing away from the bearing shells 13.

The bolts 14 used for assembly may be the same as, or different from, those used to initially connect the rod 11 and cap 12 together for machining. Where they are the same, the portions 19 must be so orientated that the side 28 thereof which has been machined away is remote from the shells 13. Where they are different, the bolts 14 used during machining become "slave" bolts and may be repeatedly used for the machining operation of other rods and caps whereas other bolts 14 may be used during final assembly. Of course where slave bolts are used repeatedly they must always be used in the same rotational position in the bolt holes.

The above arrangement provides a bearing assembly in which the centre lines of the assembly bolts are as close together as is feasible and this closeness is utilised to enable the bolts to be used to locate the shells in the bearing and to prevent rotation of the shells in the rod and end cap. The possibility of repeatedly using the same bolts for machining or using the same bolts for the machining and assembly operations facilitates production and helps to reduce assembly costs.

What is claimed is:

1. A shaft bearing comprising: two complementary parts providing an internal cylindrical surface, two arcuate bearing shells having exterior surfaces complementary to said internal cylindrical surface of said complementary parts, said two bearing shells being disposed within said parts and supported in contiguous relationship on the cylindrical surface thereof, said bearing shells having recesses formed in the external surface part way through said shells, and a first pair of connecting bolts and a second pair of connecting bolts, said first and second pairs of connecting bolts being disposed on diametrically opposite sides of said internal cylindrical surface of said parts for connecting said parts together, and said bolts extending through bolt holes in said parts and into said recesses on the external surface of said bearing shells to thereby locate said bearing shells axially of said parts and prevent rotation of the same relative said parts.

2. A shaft bearing as claimed in claim 1, in which the internal cylindrical surface is a machined surface produced by bolting the complementary parts together by means of slave bolts machining the surface and bolts and subsequently removing the bolts.

3. A shaft bearing as claimed in claim 1, in which the internal cylindrical surface is a machined surface produced by bolting the complementary parts together with connecting bolts and machining the surface and the bolts, the bolts being subsequently rotatably displaced by 180° so that their machined surface faces away from the cylindrical surface in their final position.

4. A shaft bearing as claimed in claim 1, in which each connecting bolt has a serrated portion which co-operates with a complementary serrated portion to the bolt holes to enable the bolt to be accurately located in a given position.

5. A shaft bearing as claimed in claim 4, in which the complementary serrated portion is formed in each bolt hole by pressing the bolt therein.

6. A shaft bearing as claimed in claim 1, in which each connecting bolt head has flats co-operating with adjacent material of the adjacent parts to enable the bolt to be accurately located in a given position.

7. A shaft bearing as claimed in claim 1, in which the recesses formed in the shells are complementary in shape to the shape of the bolts.

8. A method of producing and assembling a shaft bearing comprising two complementary parts including the steps of: initially bolting the two complementary parts together, then machining an internal cylindrical surface on the two complementary parts such that the envelope of the machined cylindrical surface overlaps the envelope bolt holes provided in the complementary parts, removing the bolts from the bolt holes so as to separate the complementary parts, forming recesses in the exterior surface only of a pair of part cylindrical bearing shells to a depth substantially equal to the overlap between the envelopes, then placing the shells in the respective parts and positioning the respective parts to receive holding bolts, inserting the holding bolts into the bolt holes so that they engage and locate in the recesses on the exterior of said shells to axially position said shells relative to said parts and to prevent said shells from rotating relative to said parts, and tightening said bolts to finally assemble said parts around a shaft thereby supported.

9. A method as claimed in claim 8, in which the bolts holding the parts finally together around the shaft are the same bolts as those used to hold the parts together for the machining operation, but displaced so that parts of the bolts machined away are remote from the internal surface of the bearing.

10. A method as claimed in claim 8, in which slave bolts are used to connect the two parts together for the machining operation and different holding bolts are used in the final assembly about the shaft.

* * * * *